United States Patent
Chen et al.

(10) Patent No.: US 9,744,631 B2
(45) Date of Patent: Aug. 29, 2017

(54) POSITIONING CLAMP HAVING PIVOTAL ARMS AND A CAM WITH MOVEMENT REGULATION

(71) Applicants: SHENZHEN FUTAIHONG PRECISION INDUSTRY CO., LTD., Shenzhen (CN); FIH (HONG KONG) LIMITED, Kowloon (HK)

(72) Inventors: Ze Chen, Shenzhen (CN); Bing Yu, Shenzhen (CN); Jian-Ping Jin, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 240 days.

(21) Appl. No.: 14/554,276

(22) Filed: Nov. 26, 2014

(65) Prior Publication Data

US 2015/0151392 A1 Jun. 4, 2015

(30) Foreign Application Priority Data

Nov. 30, 2013 (CN) .......................... 2013 1 0621678

(51) Int. Cl.
*B23P 19/06* (2006.01)
*B25B 5/08* (2006.01)
*B23P 19/00* (2006.01)

(52) U.S. Cl.
CPC ............. *B23P 19/06* (2013.01); *B23P 19/006* (2013.01); *B25B 5/087* (2013.01)

(58) Field of Classification Search
CPC ........ B23P 19/006; B23P 19/06; B25B 5/087; B66F 9/07559; B66F 7/10; B66F 3/16; B66F 3/18; B60G 21/0226
(Continued)

(56) References Cited

U.S. PATENT DOCUMENTS 770,270 A * 9/1904 Dehn ................... B23D 15/145
269/234
1,157,969 A * 10/1915 Tobin ..................... B25B 23/10
279/109
(Continued)

FOREIGN PATENT DOCUMENTS

CN 201357280 Y 12/2009
CN 201714217 U 1/2011
(Continued)

*Primary Examiner* — Joseph J Hail
*Assistant Examiner* — Arman Milanian
(74) *Attorney, Agent, or Firm* — Steven Reiss

(57) ABSTRACT

A clamp apparatus includes a mounting module, a clamp module, and an actuator. The clamp module includes two facing arms and a cam clamped between the two arms. Each arm is rotatably mounted to the mounting module and has a clamp end. The clamp module is configured to have a clamped configuration in which each clamp end is engaged with the object and an open configuration in which the object is free from each of the clamp ends, and further configured to operate between the clamped configuration and the open configuration. The actuator is configured to drive the cam thereby imparting motive force to the two arms during the operation between the clamped configuration and the open configuration.

20 Claims, 4 Drawing Sheets

(58) Field of Classification Search
USPC ......... 254/418, 419, 420, 422, 424; 269/34;
294/116, 115
See application file for complete search history.

(56) References Cited

U.S. PATENT DOCUMENTS

| | | | | |
|---|---|---|---|---|
| 3,013,517 A * | 12/1961 | Isham | ...................... | B63B 21/54 |
| | | | | 114/221 R |
| 3,170,322 A * | 2/1965 | Cavanaugh | .............. | G01N 3/04 |
| | | | | 100/264 |
| 3,566,507 A * | 3/1971 | Hellmuth | ........... | B23K 37/0533 |
| | | | | 228/4.1 |
| 3,653,802 A * | 4/1972 | Weiss | ...................... | B23P 19/06 |
| | | | | 29/240 |
| 3,817,510 A * | 6/1974 | Jatcko | ...................... | B25B 1/18 |
| | | | | 269/218 |
| 3,965,950 A * | 6/1976 | MacDonald | ............ | B25B 23/10 |
| | | | | 81/455 |
| 3,981,673 A * | 9/1976 | Sokolow | ............. | B29C 49/4205 |
| | | | | 294/115 |
| 4,036,353 A * | 7/1977 | Suter | ...................... | B65H 67/02 |
| | | | | 198/468.2 |
| 4,793,602 A * | 12/1988 | McPherson | ............ | B23Q 7/043 |
| | | | | 269/34 |
| 5,193,789 A * | 3/1993 | Tucker | .................... | B25B 5/061 |
| | | | | 269/233 |
| 5,211,061 A * | 5/1993 | Goodwin | ................ | B23P 19/06 |
| | | | | 702/41 |
| 6,079,896 A * | 6/2000 | Dellach | .................... | B25B 5/087 |
| | | | | 269/32 |
| 6,290,210 B1 * | 9/2001 | Horn | ...................... | B23Q 7/043 |
| | | | | 254/34 |
| 6,314,845 B1 * | 11/2001 | Wu | ........................ | B23P 19/006 |
| | | | | 81/454 |
| 6,361,095 B1 * | 3/2002 | Attee | ...................... | B25B 5/087 |
| | | | | 294/119.1 |
| 6,634,630 B2 * | 10/2003 | Horn | ...................... | B23Q 7/043 |
| | | | | 269/34 |
| RE41,223 E * | 4/2010 | Dellach | ........................ | 269/32 |
| 8,051,750 B2 * | 11/2011 | Zhou | ...................... | B25B 23/10 |
| | | | | 81/452 |
| 2005/0178816 A1 * | 8/2005 | Stevenson | ............. | B21J 15/027 |
| | | | | 228/112.1 |

FOREIGN PATENT DOCUMENTS

| | | | | |
|---|---|---|---|---|
| CN | 102071306 | | 5/2011 | |
| CN | 102071306 A | * | 5/2011 | ............. C21D 10/00 |
| CN | 202219431 U | | 5/2012 | |
| CN | 202506766 U | | 10/2012 | |

* cited by examiner

POSITIONING CLAMP HAVING PIVOTAL ARMS AND A CAM WITH MOVEMENT REGULATION

FIELD

The subject matter herein generally relates to clamp apparatuses, and particularly to a clamp apparatus for clamping objects or materials.

BACKGROUND

Bolts or screws with nuts are widely used for fastening machines and structural components. When the size of the nut is small, it may be difficult to clamp the nut for threading the nut and its mating bolt together.

BRIEF DESCRIPTION OF THE DRAWINGS

Implementations of the present technology will now be described, by way of example only, with reference to the attached figures.

DETAILED DESCRIPTION

Figure 1:
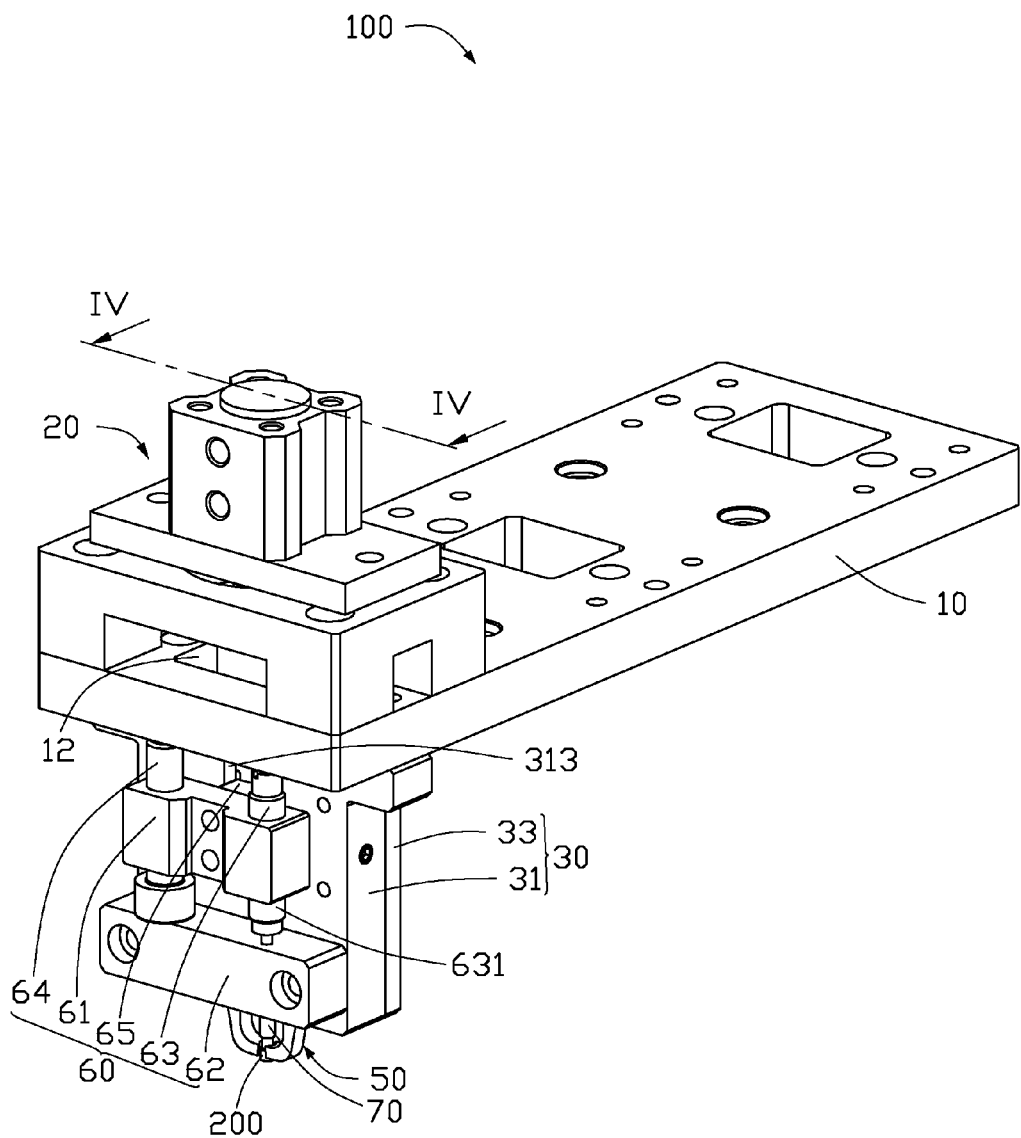
FIG. 1 is an isometric view of one embodiment of a clamp apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series and the like.

FIG. 1 illustrates an isometric view of one embodiment of a clamp apparatus 100 for clamping and mounting objects or materials, such as nuts 200. The clamp apparatus 100 includes a connecting board 10, an actuator 20, a mounting module 30, a clamp module 50, and a positioning module 70. The actuator 20 and mounting module 30 are mounted to the connecting board 10. The connecting board 10 can be coupled to a manipulator (not shown), such that the nuts 200 clamped by the clamp apparatus 100 can be moved to a destination where the nut 200 is desired to be placed by the manipulator.

Figure 2:
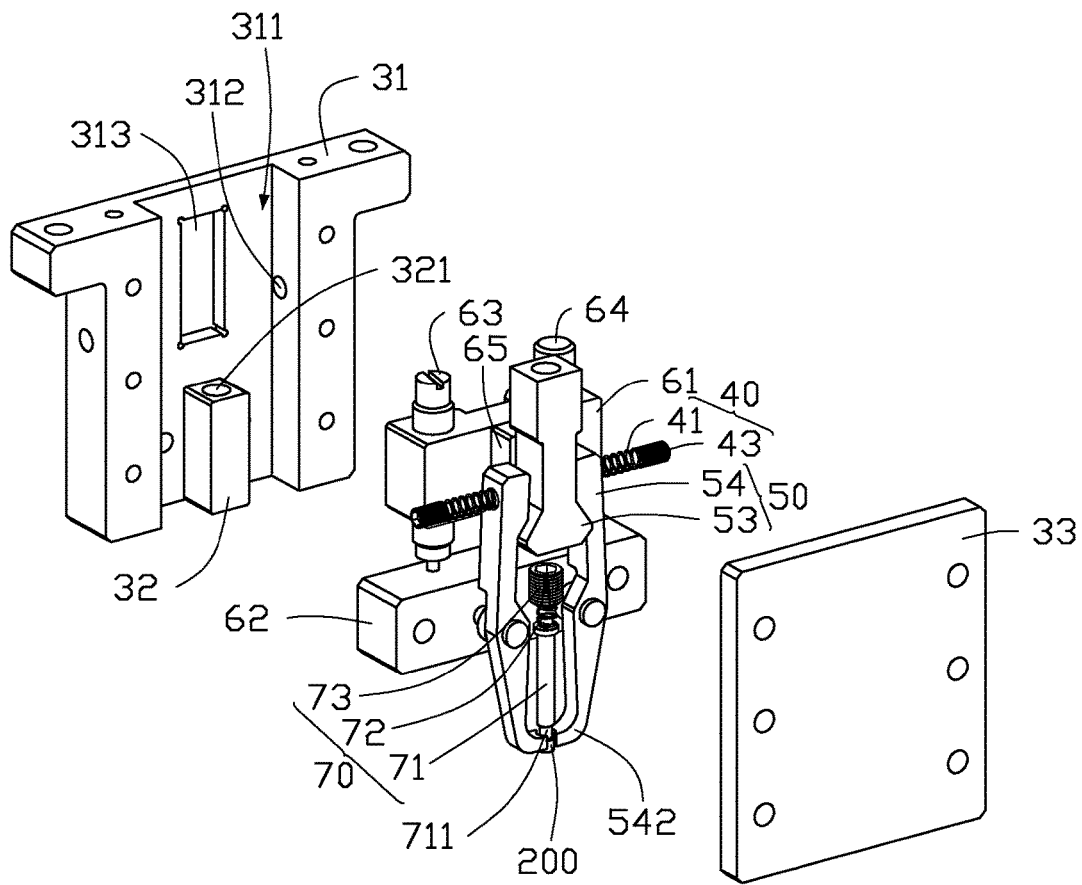
FIG. 2 illustrates an exploded view of the clamp apparatus as shown in FIG. 1 without a connecting board and an actuator of the clamp apparatus.

FIG. 2 illustrates an exploded view of the clamp apparatus 100 as shown in FIG. 1 without the connecting board 10 and the actuator 20. The mounting module 30 includes a base 31, a mounting block 32, and a cover 33. The base 31 defines a mounting groove 311 terminating on two opposite edges of the base 31. The mounting groove 311 is configured to receive the clamp module 50, and includes two sidewalls each of which defines a mounting hole 312 with a plurality of threads (now shown). A through hole 313 is defined through a bottom wall of the mounting groove 31. The mounting block 32 is fixed into the mounting groove 31, and has a receiving hole 321 defined therethrough. The receiving hole 321 is configured to mount the positioning module 70. The cover 33 is assembled to the base 31 to cover the mounting groove 311 to shield the clamp module 50 and the positioning module 70.

The apparatus 100 is also provided with a returning module 40 that is received in the mounting groove 311. The returning module 40 includes two elastic members 41 and two fasteners 43. Each fastener 43 is coupled to an end of one of the elastic members 41, and is also screwed into one of the mounting hole 312. The clamp module 50 includes two arms 54 facing each other, and a cam 53 clamped between the two arms 54. The two arms 54 are configured to either clamp or release the nut 200 under the control of the cam 53. Each elastic member 41 elastically resists between one of the two arms 54 and one of the two fasteners 43 (also see FIG. 4).

The positioning module 70 includes a pin 71, a spring 72, and a fastener 73. The pin 71 includes a positioning end 711 configured to resist and position the nut 200. The fastener 73 is received in the receiving hole 321 and fixed in the receiving hole 321 by threads (not shown) of the fastener 73 and the receiving hole 321 (also see FIG. 4). The spring 72 is received in the receiving hole 321 (also see FIG. 4) and elastically resists between the pin 71 and the fastener 73. When the positioning end 711 of the pin 71 resists against the nut 200, the pin 71 moves toward the spring 72 and compresses the spring 72. After the positioning end 711 is separated from the nut 200, the spring 72 drives the pin 71 to move back.

Figure 3:
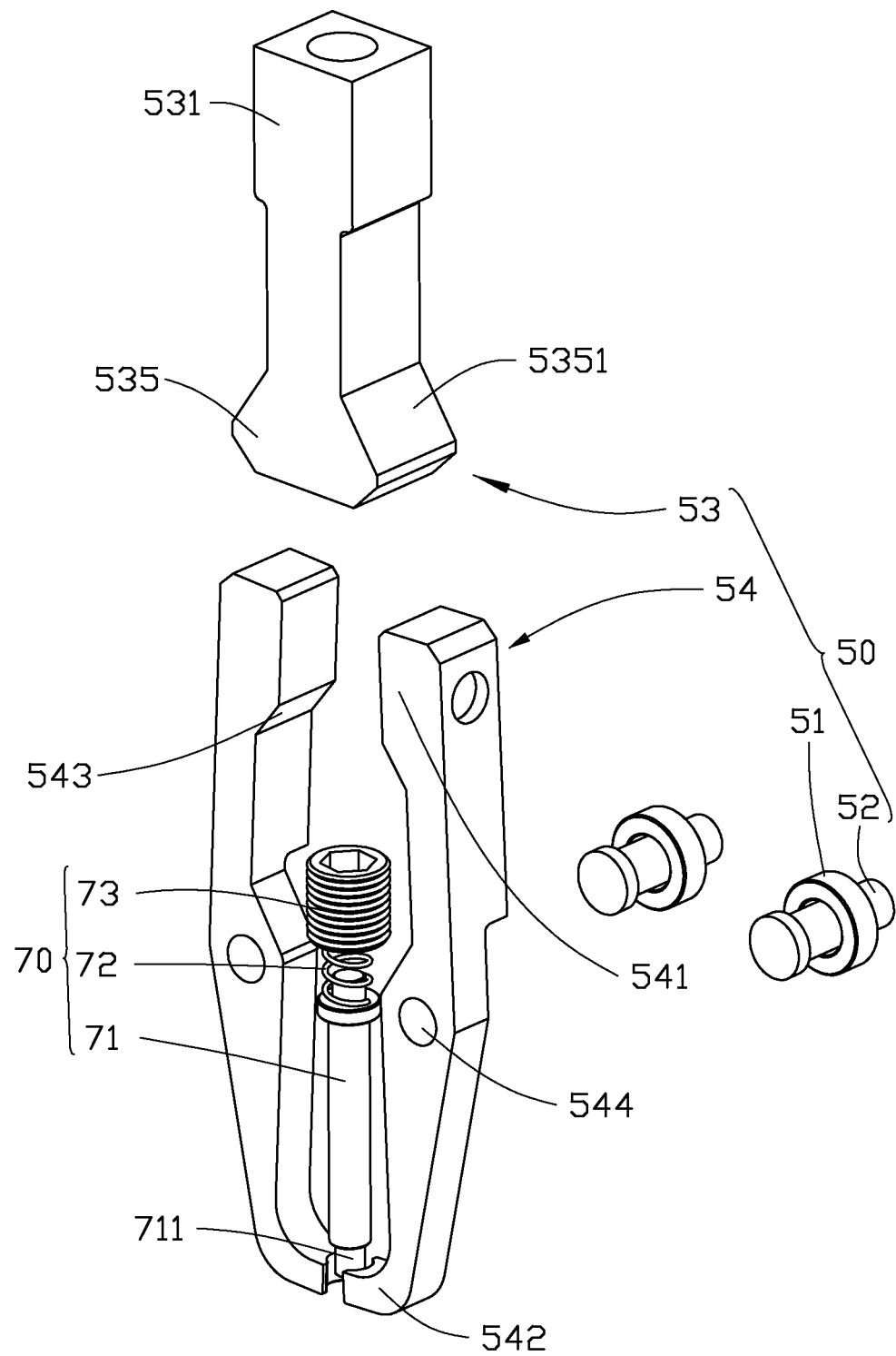
FIG. 3 illustrates an exploded view of a clamp module and a positioning module of the clamp apparatus as shown in FIG. 1.

FIG. 3 illustrates an exploded view of the clamp module 50 and the positioning module 70. The cam 53 includes a head 531, and a cam body 535 extends from the head 531. The cam body 535 defines two symmetrical first inclined surfaces 5351 facing the head 531. Each arm 54 includes a mounting end 541 and a clamp end 542 opposite the mounting end 541. The mounting end 541 of each arm 54 includes a second inclined surface 543 facing the clamp end 542. The cam 53 is positioned between the two arms 54, and the two first inclined surfaces 5351 slidably resist against the two second inclined surfaces 543 of the two arms 54. The two clamp ends 542 of the two arms 54 cooperate to clamp an object, such as the nut 200 as shown in FIG. 1 and FIG. 2.

The clamp module 50 is also provided with two washers 51 and two shafts 52. Each arm 54 includes a rotating hole 544 defined through a middle portion thereof. The two shafts 52 are located at two opposite sides of the mounting block 32 (also see FIG. 2 and FIG. 4), such that the two arms 54 are located at two opposite sides of the mounting block 32, and the pin 71 is positioned between the two arms 54. Each shaft 52 is rotatably extended through the rotating hole 544 of one of the two arms 54, such that the arm 54 can rotate about the corresponding shaft 52. Each washer 51 resists between one of the two arms 54 and the bottom wall of the mounting groove 311.

Figure 4:
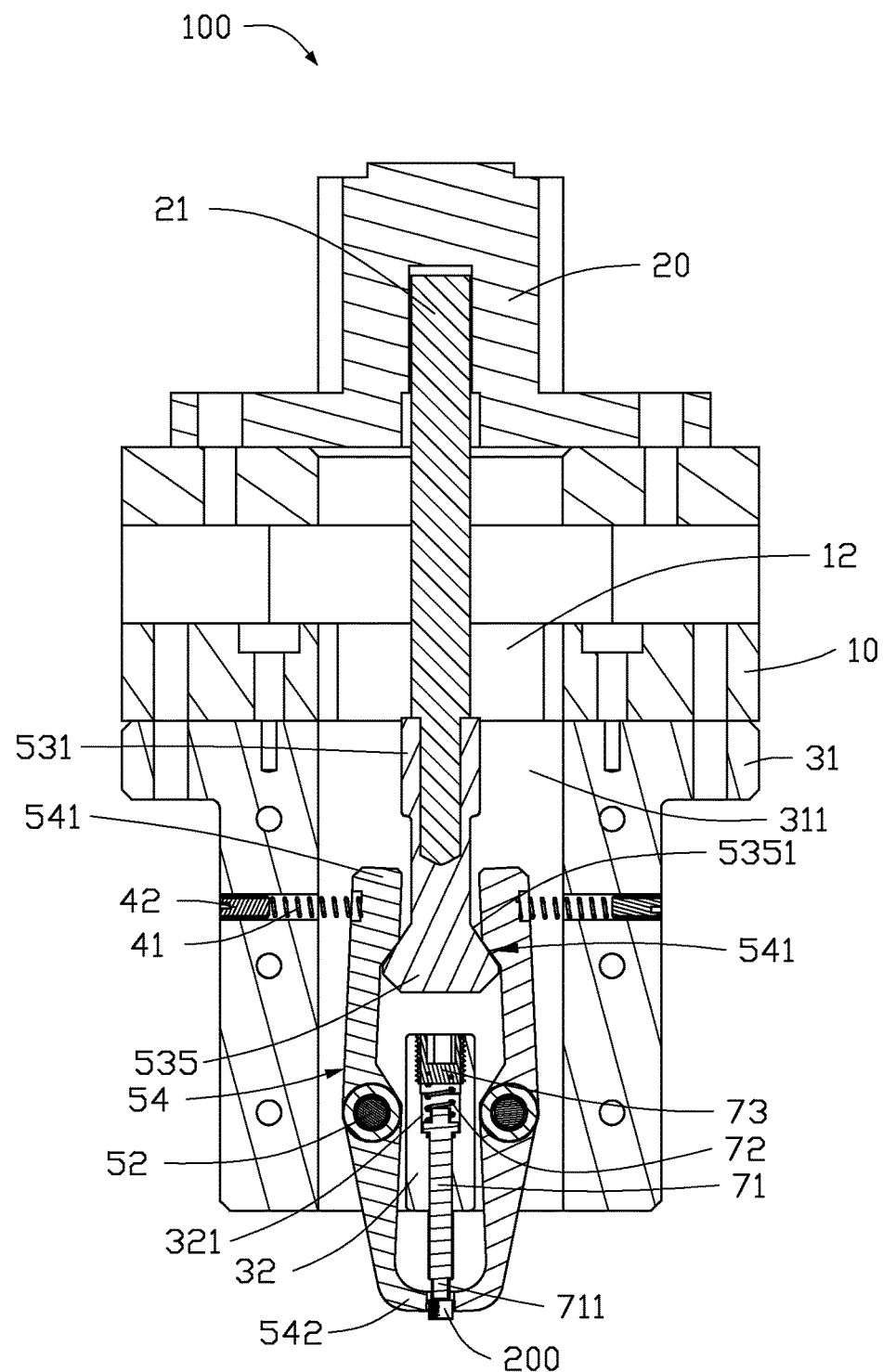
FIG. 4 illustrates a cross sectional view of the clamp apparatus as shown in FIG. 1 along line IV-IV.

FIG. 4 illustrates a cross sectional view of the clamp apparatus 100 as shown in FIG. 1 along line IV-IV. The connecting board 10 includes a through hole 12 defined therethrough. The actuator 20 is a cylinder and includes a rod 21 extending through the through hole 12 and coupled to the head 531 of the cam 53. In use, the actuator 20 can drive the cam 53 to move relative to the two arms 54 along a first direction A and a second direction B opposite the first direction A in turn, thereby transitioning the two arms 54 between (i) a clamp configuration in which each clamp end 542 is engaged with the nut 100; and (ii) an open configuration in which the nut 200 is free from each of the clamp ends 542. In particular, when the actuator 20 drives the cam 53 to move along the direction A, the cam 53 pushes the mounting ends 541 of the two arms 54 by the first inclined surfaces 5351 sliding relative to the second inclined surfaces 543. The mounting ends 541 of the two arms 54 move away from each other to compress the two elastic members 41, and the two arms 54 pivot about the corresponding shaft 52 to drive the two clamp ends 542 to move toward each other, such that the nut 200 positioned by the pin 71 is clamped tightly by the two clamp ends 542. After the clamp apparatus 100 is moved to a destination where the nut 200 is desired to be placed by the manipulator, the actuator 20 drives the cam 53 to move along the direction B, and the two elastic members 41 drive the two mounting ends 541 of the two arms 54 to move toward each other, such that the two clamp ends 542 move away from each other to release the nut 200.

Referring back to FIGS. 1-2, the clamp apparatus 100 is further provided with a regulating module 60 configured to regulate a distance between the two clamp ends 542 in the open configuration. The regulating module 60 includes a sliding block 61, a fixing block 62, a limiting pole 63, a guiding pole 64, and a connecting block 65. The fixing block 62 is fixed to a surface of the base 31 opposite the cover 33. The guiding pole 64 is fixed to the fixing block 62. The sliding block 61 is slidably mounted to the guiding pole 64, and can slide along the guiding pole 64 to move toward or away from the fixing block 62. The connecting block 65 is coupled between the sliding block 61 and the cam 53 (also see FIG. 2), such that the sliding block 61 can move with the cam 53 together. The limiting pole 63 is screwed to the sliding block 61, and includes a resisting portion 631 disposed between the sliding block 61 and the fixing block 62. The resisting portion 631 is configured to resist against the fixing block 62 to limit the movement of the sliding block 61 and the cam 53. For example, as illustrated in FIG. 4, the cam 53 can move relative to the arms 54 along the direction B (see FIG. 4) until the resisting portion 631 resists against the fixing block 62. A length of the resisting portion 631 can be regulated by suitably screwing The limiting pole 63 with respect to the sliding block 61. Thus, the movement of the cam 53 along the direction B can be regulated accordingly, and the distance between the two clamp ends 542 can also be regulated to adapt to nuts of different sizes.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A clamp apparatus comprising:
a mounting module;
a positioning module coupled to the mounting module, and configured to position an object to be clamped;
a clamp module comprising two facing arms and a cam clamped between the two arms, each of the two arms rotatably mounted to the mounting module and having a clamp end; the clamp module configured to have a clamped configuration in which each clamp end is engaged with the object and an open configuration in which the object is free from each clamp end; the clamp module configured to operate between the clamped configuration and the open configuration;
an actuator coupled to the cam and configured to drive the cam thereby imparting motive force to the two arms during the operation between the clamped configuration and the open configuration; and
a regulating module configured to regulate a distance between the two clamp ends in the open configuration, wherein the regulating module comprises a sliding block, a fixing block, and a limiting pole; the fixing block is fixed to the mounting module; the sliding block is coupled to the cam and configured to move with the cam together; the limiting pole is screwed to the sliding block, and comprises a resisting portion disposed between the sliding block and the fixing block; the resisting portion is configured to resist against the fixing block to limit the movement of the sliding block and the cam.

2. The clamp apparatus of claim 1, wherein the cam comprises a head and a cam body extends from the head, the cam body defines two symmetrical first inclined surfaces facing the head; each arm comprises a mounting end opposite to the clamp end, the mounting end of each arm defines a second inclined surface facing the clamp end; the two first inclined surfaces are slidably resist against the two second inclined surfaces of the two arms; the two clamp ends of the two arms configured to cooperatively clamp the object.

3. The clamp apparatus of claim 2, wherein the actuator is a cylinder, and comprises a rod coupled to the head of the cam.

4. The clamp apparatus of claim 2, wherein the clamp module further comprises two washers and two shafts; each arm comprises a rotating hole defined through a middle portion thereof; each shaft is fixed to the mounting module, and is rotatably extended through the rotating hole of one of the two arms; each washer resists between one of the two arms and the mounting module.

5. The clamp apparatus of claim 2, further comprising a returning module that comprises two elastic members; wherein the mounting module comprises a base having a mounting groove terminates on opposite two edges of the base, the mounting groove comprises two sidewalls each of which defines a mounting hole; each elastic member elastically resists between one of the two arms and one of the two mounting holes.

6. The clamp apparatus of claim 5, wherein the mounting module further comprises a mounting block fixed into the mounting groove and has a receiving hole defined through the mounting block; the positioning module comprises a pin, a spring and a fastener; the pin comprises a positioning end configured to resist and position the object; the fastener is received in and fixed to the receiving hole; the spring is received in the receiving hole and elastically resists between the pin and the fastener.

7. The clamp apparatus of claim 6, wherein the two arms are located at two opposite sides of the mounting block, the pin is positioned between the two arms.

8. The clamp apparatus of claim 1, wherein the regulating module further comprises a guiding pole fixed to the fixing block, the sliding block is slidably mounted to the guiding pole, and configured to slide along the guiding pole to move toward or away from the fixing block.

9. A clamp apparatus comprising:
a mounting module;
a positioning module coupled to the mounting module, and configured to position an object to be clamped;
a clamp module comprising two facing arms and a cam; each arm rotatably coupled to the mounting module, and comprising a mounting end and a clamp end opposite the mounting end, the two clamp ends of the two arms configured to cooperatively clamp the object; the cam sandwiched between the two mounting ends of the two arms;
a returning module comprising two elastic members each of which elastically resists between the mounting end of one of the two arms and the mounting module;
an actuator coupled to the cam, and configured to drive the cam to move relative to the two arms along a first direction, allowing the cam drives the clamp ends of the two arm to move toward each other, thereby the object is capable of being clamped between the two clamp ends; and configured to drive the cam to move relative to the two arms along a second direction opposite the first direction, allowing the elastic members drive the clamp ends of the two arms to move away from each other, and the object is permitted to release from the two clamp ends; and
a regulating module configured to regulate a distance between the two clamp ends in the open configuration, wherein the regulating module comprises a sliding block, a fixing block, and a limiting pole; the fixing block is fixed to the mounting module; the sliding block is coupled to the cam and configured to move with the cam together; the limiting pole is screwed to the sliding block, and comprises a resisting portion disposed between the sliding block and the fixing block; the resisting portion is configured to resist against the fixing block to limit the movement of the sliding block and the cam.

10. The clamp apparatus of claim 9, wherein the cam comprises a head and a cam body extends from the head, the cam body defines two symmetrical first inclined surfaces facing the head; the mounting end of each arm defines a second inclined surface facing the clamp end; the two first inclined surfaces slidably resist against the two second inclined surfaces of the two arms.

11. The clamp apparatus of claim 10, wherein the clamp module further comprises two washers and two shafts; each arm comprises a rotating hole defined through a middle portion thereof; each shaft is fixed to the mounting module, and is rotatably extended through the rotating hole of one of the two arms; each washer resists between one of the two arms and the mounting module.

12. The clamp apparatus of claim 10, wherein the mounting module comprises a base having a mounting groove terminates on opposite two edges of the base, the mounting groove comprises two sidewalls each of which defines a mounting hole; each elastic member elastically resists between one of the two arms and one of the two mounting holes.

13. The clamp apparatus of claim 12, wherein the mounting module further comprises a mounting block fixed into the mounting groove and has a receiving hole defined through the mounting block; the positioning module comprises a pin, a spring and a fastener; the pin comprises a positioning end configured to resist and position the object; the fastener is received in and fixed to the receiving hole; the spring is received in the receiving hole and elastically resists between the pin and the fastener.

14. The clamp apparatus of claim 13, wherein the two arms are located at two opposite sides of the mounting block, the pin is positioned between the two arms.

15. The clamp apparatus of claim 9, wherein the regulating module further comprises a guiding pole fixed to the fixing block, the sliding block is slidably mounted to the guiding pole, and configured to slide along the guiding pole to move toward or away from the fixing block.

16. A clamp apparatus comprising:
a mounting module;
a positioning module coupled to the mounting module, and configured to position an object to be clamped;
a clamp module comprising two facing arms and a cam clamped between the two arms, each of the two arms rotatably mounted to the mounting module and having a clamp end; the clamp module configured to have a clamped configuration in which each clamp end is engaged with the object and an open configuration in which the object is free from each clamp end; the clamp module configured to operate between the clamped configuration and the open configuration; and
an actuator coupled to the cam and configured to drive the cam thereby imparting motive force to the two arms during the operation between the clamped configuration and the open configuration;
wherein the mounting module comprises a base having a mounting groove terminates on opposite two edges of the base; the mounting module further comprises a mounting block fixed into the mounting groove and has a receiving hole defined through the mounting block; the positioning module comprises a pin, a spring and a fastener; the pin comprises a positioning end configured to resist and position the object; the fastener is received in and fixed to the receiving hole; the spring is received in the receiving hole and elastically resists between the pin and the fastener.

17. The clamp apparatus of claim 16, wherein the cam comprises a head and a cam body extends from the head, the cam body defines two symmetrical first inclined surfaces facing the head; each arm comprises a mounting end and a clamp end opposite the mounting end, the mounting end of each arm defines a second inclined surface facing the clamp end; the two first inclined surfaces are slidably resist against the two second inclined surfaces of the two arms; the two clamp ends of the two arms configured to cooperatively clamp the object.

18. The clamp apparatus of claim 16, further comprising a returning module that comprises two elastic members; wherein the mounting groove comprises two sidewalls each of which defines a mounting hole; each elastic member elastically resists between one of the two arms and one of the two mounting holes.

19. The clamp apparatus of claim 16, further comprising a regulating module configured to regulate a distance between the two clamp ends in the open configuration, wherein the regulating module comprises a sliding block, a fixing block, and a limiting pole; the fixing block is fixed to the mounting module; the sliding block is coupled to the cam and configured to move with the cam together; the limiting pole is screwed to the sliding block, and comprises a resisting portion disposed between the sliding block and the fixing block; the resisting portion is configured to resist against the fixing block to limit the movement of the sliding block and the cam.

20. The clamp apparatus of claim 19, wherein the regulating module further comprises a guiding pole fixed to the fixing block, the sliding block is slidably mounted to the guiding pole, and configured to slide along the guiding pole to move toward or away from the fixing block.

\* \* \* \* \*